(12) United States Patent
Berger et al.

(10) Patent No.: US 6,360,001 B1
(45) Date of Patent: Mar. 19, 2002

(54) AUTOMATIC LOCATION OF ADDRESS INFORMATION ON PARCELS SENT BY MASS MAILERS

(75) Inventors: Israel Berger; Dan Chevion; Andrei Heilper, all of Haifa; Yaakov Navon, Ein Vered; Asaf Tzadok, Kiryat Yam; Martin Tross; Eugene Wallach, both of Haifa, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,700

(22) Filed: May 10, 2000

(51) Int. Cl.[7] .................................................. G06K 9/00
(52) U.S. Cl. ...................................................... 382/101
(58) Field of Search ................................ 382/101, 102, 382/287, 291, 292, 317; 209/584

(56) References Cited

U.S. PATENT DOCUMENTS

| | | | | |
|---|---|---|---|---|
| 3,801,775 A | * | 4/1974 | Acker .................. 235/61.11 E |
| 5,025,475 A | * | 6/1991 | Okabe .............................. 382/1 |
| 5,050,218 A | * | 9/1991 | Ikeda et al. ..................... 382/1 |
| 5,103,489 A | | 4/1992 | Miette ........................... 382/48 |
| 5,199,084 A | * | 3/1993 | Kishi et al. .................... 382/48 |
| 5,307,423 A | * | 4/1994 | Gupta et al. .................. 382/11 |
| 5,617,481 A | * | 4/1997 | Nakamura .................. 382/101 |
| 5,754,671 A | * | 5/1998 | Higgins et al. ............. 382/101 |
| 5,770,841 A | | 6/1998 | Moed et al. ................. 235/375 |
| 6,115,707 A | * | 9/2000 | Shimomura .................... 707/6 |
| 6,246,794 B1 | * | 6/2001 | Kagehiro et al. ........... 382/185 |

* cited by examiner

*Primary Examiner*—Andrew W. Johns
(74) *Attorney, Agent, or Firm*—Darby & Darby

(57) ABSTRACT

A method for automatic sorting includes receiving an item in a sequence of items to be sorted, each such item marked with a respective machine-readable identifying code and with respective characters in a location relative to the code that varies from one item to another in the sequence. A position of the code on the item is determined and, responsive to the position of the code, the location of the characters on the item is found. The characters are processed to determine a destination of the item.

49 Claims, 6 Drawing Sheets

AUTOMATIC LOCATION OF ADDRESS INFORMATION ON PARCELS SENT BY MASS MAILERS

FIELD OF THE INVENTION

The present invention relates generally to package tracking systems, and specifically to systems for automatically reading and decoding package information, such as alphanumeric destination addresses.

BACKGROUND OF THE INVENTION

Postal services and package delivery companies typically handle as many as several million parcels each day. Automated parcel sorting and routing facilities are being used increasingly in order to improve the efficiency and accuracy with which this huge volume of parcels is handled.

The process of sorting and tracking parcels as they proceed through sorting centers requires that each parcel bear two types of information: the destination address of the parcel and a tracking number, which uniquely distinguishes it from other parcels in the system. The information is generally printed on a parcel label, with the destination address in alphanumeric form, and the tracking number in a machine-readable form, such as a barcode. While the destination address tells where the parcel is to go, the tracking number assists the postal service or parcel company in managing its shipment operations and enables it to track parcels as they move through the system. Typically, if the sender of the parcel is a mass mailer who has a contract with the postal service or package company, the tracking number includes a unique code that identifies the sender. In the German postal system, for example, there are about 100,000 such mass-mailer identification codes in use.

In order to sort and route the parcels automatically, the destination address and tracking number are typically read by a high-resolution imaging system. An image processor must then rapidly locate and read the barcode (and/or other machine-readable indicia) and the destination address on the parcel. This task is complicated by the fact that parcels vary greatly in size and shape, and may be placed on a conveyor belt for sorting in substantially any orientation. Furthermore, it frequently occurs that there is other writing on the parcel besides the destination address, such as the return address. Therefore, one of the most difficult problems in automatic parcel sorting is to identify the destination address quickly, correctly and consistently. Otherwise, parcels may be sent to the wrong destination, leading to added expense and customer dissatisfaction.

U.S. Pat. No. 5,103,489, whose disclosure is incorporated herein by reference, describes a label, method and device for locating addresses on articles to be sorted. A specific addressing mark, which typically comprises a ring and an asymmetric logotype, is associated with the address on an addressing label or other addressing support. The addressing mark is chosen so as to enable the address in the digitized image of the article to be located uniquely. To this end, the addressing mark made is inherently different from virtually all characters and graphics likely to be carried by the various articles to be sorted. In other words, location of the address is dependent on customers' using labels that have a specific mark appearing on the label in a certain position relative to the address.

U.S. Pat. No. 5,770,841, whose disclosure is also incorporated herein by reference, describes a system and method for reading package information. An imaging system captures an image of a package surface that includes a machine-readable code, such as a bar code, and an alphanumeric destination address. The destination address is identified on the package by means of a fluorescent ink fiducial mark located within a destination address block on the package surface. A label decoding system locates and decodes the machine readable code and uses OCR techniques to read the destination address. Thus, in this patent, too, location of the destination address is dependent on customers' use of a label with a special identifying mark appearing in a fixed relation to the address.

SUMMARY OF THE INVENTION

It is an object of some aspects of the present invention to provide improved methods and systems for parcel sorting.

It is a further object of some aspects of the present invention to provide improved methods and systems for automatically identifying the destination address on a parcel label.

It is yet a further object of some aspects of the present invention to provide methods and systems for automatically identifying the destination address on parcel labels without requiring shipping labels to have a particular fixed layout or dedicated identifying marks.

In preferred embodiments of the present invention, a parcel label comprises at least one machine-readable code, typically a barcode, and a destination address. A parcel sorting system identifies and reads the code. The content and/or the position of the code on the label are used to locate the destination address, by comparing the label to known types stored in a memory of the system. If the code identifies a particular mass mailer as the sender of the parcel, the system preferably recalls a known label layout that has been commonly used in the past by this mass mailer. The known layout is then used to find the destination address on the current label, with the position of the code serving as a reference. On the other hand, if the mass mailer or the mailer's preferred label layout is not known, the position of the code or codes found on the label is compared to a database of known label types or topological classes to which labels may belong. The location of the destination address is then determined by finding the closest match to a known type or class.

Thus, the present invention uses the code on the label to find the destination address rapidly and reliably. There is no need for any special characters or special ink to be used on the label, and mailers are therefore free to use a label of their choice, within broad constraints. The system operates without a priori knowledge of the label layout or type. Preferably, after finding what appears to be the destination address, the system verifies that the address is valid, for example to ensure that the sender and destination addresses have not been accidentally confused.

There is therefore provided, in accordance with a preferred embodiment of the present invention, a method for automatic sorting, including:

receiving an item in a sequence of items to be sorted, each such item marked with a respective machine-readable identifying code and with respective characters in a location relative to the code that varies from one item to another in the sequence;

determining a position of the code on the item;

responsive to the position of the code, finding the location of the characters on the item; and processing the characters to determine a destination of the item.

Typically, the items include parcels in shipment, and the code and characters are printed on a label affixed to the item. Preferably, the code includes a barcode.

Preferably, the respective identifying code identifies a sender of the item, and finding the location of the characters includes finding a location based on a known layout of the characters relative to the code, wherein the known layout is associated with the identified sender.

Alternatively or additionally, determining the position of the code includes determining positions of first and second machine-readable codes on the item, and wherein finding the location of the characters includes locating the characters in a coordinate frame defined by the first and second codes. Preferably, locating the characters includes finding a known layout of a marking pattern on some of the items in the sequence based on the positions of the first and second codes, and locating the characters in the known layout. Typically, the marking pattern corresponds to a label affixed to the item, on which the codes and the characters are printed.

Further alternatively or additionally, finding the location of the characters includes:

defining a plurality of topological classes, each class characterized by a common position of the code in a marking pattern on the items in the class and an area, relative to the code, in which the characters are located;

assigning the item to one of the classes based on the position of the code thereon; and finding the characters in the area that characterizes the class to which the item is assigned.

Preferably, defining the topological classes includes defining classes that are invariant under rotation of the marking pattern. Most preferably, the code includes a barcode, and each class is further characterized by a reading direction of the barcode relative to the marking pattern. Typically, the marking pattern corresponds to a label affixed to the item, on which the codes and the characters are printed, wherein the classes are further characterized by a shape of the label, and wherein assigning the item to one of the classes includes assigning the item responsive to the shape of the label affixed thereto.

In a preferred embodiment, processing the characters includes verifying that the characters represent a valid destination for the item. Preferably, the respective identifying code identifies a sender of the item, and verifying that the characters represent a valid destination includes verifying that the determined destination does not includes an address of the sender.

There is also provided, in accordance with a preferred embodiment of the present invention, a method for automatic sorting, including:

receiving an item in a sequence of items to be sorted, each such item marked with a respective machine-readable code identifying a sender of the item and with respective characters indicative of a destination of the item;

reading the code on the item; and processing the characters on the item, responsive to the code and to the sender identified thereby, to determine a destination of the item.

Preferably, reading the code includes determining a position of the code on the item, and processing the characters includes finding a location of the characters responsive to the position of the code. Further preferably, reading the code includes identifying the sender responsive to the code, and finding the location of the characters includes associating a layout of the characters relative to the code with the identified sender, and determining the location based on the known layout. Most preferably, associating the layout with the identified sender includes maintaining, for each of a plurality of senders including the identified sender of the item, a respective record of one or more layouts used consistently by the sender to mark the code and characters on the items to be sorted, and selecting the known layout from the respective record. Preferably, maintaining the respective record includes processing multiple items sent by the sender so as to find the one or more layouts used consistently by the sender.

In a preferred embodiment, reading the code includes identifying the sender responsive to the code, and processing the characters includes verifying that the characters represent a valid destination for items sent by the identified sender. Preferably, verifying that the characters represent the valid destination includes verifying that the determined destination does not includes an address of the sender, most preferably by comparing a postal code in the determined destination to a known postal code of the sender. Additionally or alternatively, verifying that the characters represent the valid destination includes comparing words spelled by the characters to a predetermined list of keywords. Further additionally or alternatively, verifying that the characters represent the valid destination includes recognizing that the item has been returned from an original recipient of the item to the sender identified by the code, so that an address of the sender includes the valid destination.

There is additionally provided, in accordance with a preferred embodiment of the present invention, apparatus for automatic sorting, which is configured to receive an item in a sequence of items to be sorted, each such item marked with a respective machine-readable identifying code and with respective characters in a location relative to the code that varies from one item to another in the sequence, the apparatus including a processor, which is adapted to determine a position of the code on the item and, responsive to the position of the code, to find the location of the characters on the item and to process the characters to determine a destination of the item.

In a preferred embodiment, the apparatus includes an imaging device, configured to capture an image of the item, wherein the processor is adapted to process the image in order to determine the destination of the item.

In another preferred embodiment, the apparatus includes an automatic sorter, which is operative to route the item to the determined destination.

There is further provided, in accordance with a preferred embodiment of the present invention, apparatus for automatic sorting, which is configured to receive an item in a sequence of items to be sorted, each such item marked with a respective machine-readable code identifying a sender of the item and with respective characters indicative of a destination of the item, and including a processor, which is operative to read the code on the item and to process the alphanumeric characters on the item, responsive to the code and to the sender identified thereby, to determine a destination of the item.

There is moreover provided, in accordance with a preferred embodiment of the present invention, a computer program product, including a computer-readable medium in which program instructions are stored, which instructions, when read by a computer receiving an image of an item in a sequence of items to be sorted, each such item marked with a respective machine-readable identifying code and with respective characters in a location relative to the code that varies from one item to another in the sequence, cause the computer to determine a position of the code on the item and, responsive to the position of the code, to find the location of the characters on the item and to process the characters to determine a destination of the item.

There is furthermore provided, in accordance with a preferred embodiment of the present invention, a computer program product for automatic sorting, including a computer-readable medium in which program instructions are stored, which instructions, when read by a computer receiving an image of an item in a sequence of items to be sorted, each such item marked with a respective machine-readable code identifying a sender of the item and with respective characters indicative of a destination of the item, cause the computer to read the code on the item, and to process the characters on the item, responsive to the code and to the sender identified thereby, to determine a destination of the item.

The present invention will be more fully understood from the following detailed description of the preferred embodiments thereof, taken together with the drawings in which:

DETAILED DESCRIPTION OF PREFERRED EMBODIMENTS

Figure 1:
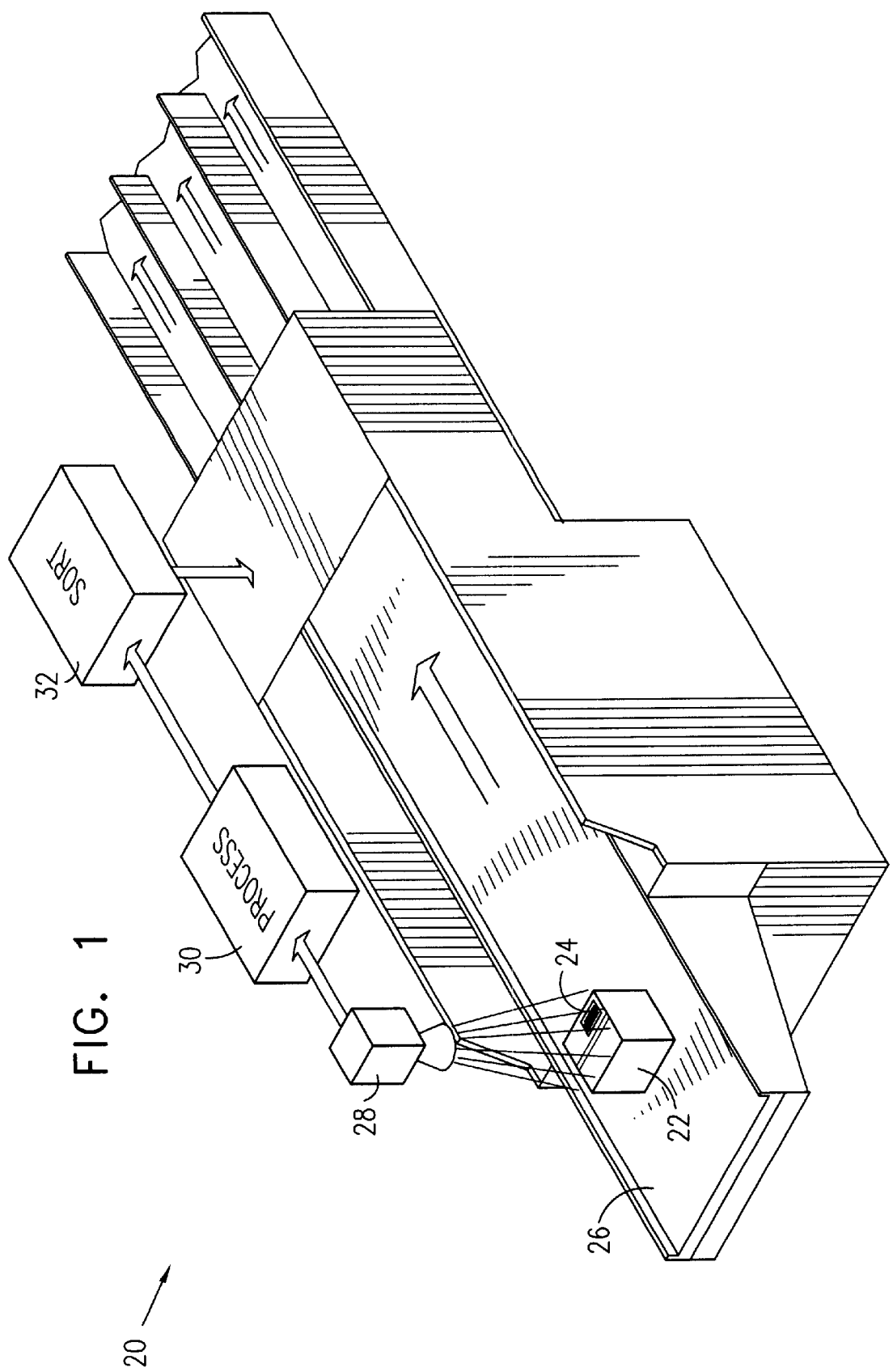
FIG. 1 is a schematic, pictorial illustration of a system for parcel sorting, in accordance with a preferred embodiment of the present invention.

FIG. 1 is a schematic, pictorial illustration of a system 20 for parcel sorting, in accordance with a preferred embodiment of the present invention. A parcel 22, having a label 24 thereon, is transported by a conveyor 26. An image of the parcel is captured by an imaging device, such as a video or digital still camera 28. The image captured by the camera is digitized and passed to a processor 30, which applies the methods described hereinbelow to identify a destination address on label 24. Alternatively, the processor may receive the image from some other source, or it may retrieve the image from a memory (not shown). The processor then reads the identified address automatically and drives a sorter 32 to route the parcel accordingly.

Processor 30 preferably comprises a general-purpose computer, programmed with appropriate software to carry out the methods of the present invention. This software may be downloaded to the processor in electronic form, over a network, for example, or alternatively, it may be supplied on tangible media, such as CD-ROM, for installation in the processor. Such software may similarly be adapted for use in other image processing applications, and may thus be supplied to and installed on other computers in like manner. Alternatively, the methods described herein may be implemented using dedicated hardware or a programmable digital signal processor, or using a combination of dedicated and/or programmable elements and/or software. The use of processor 30 in parcel sorting system 20 is described here by way of example, and not limitation.

Figure 2A:
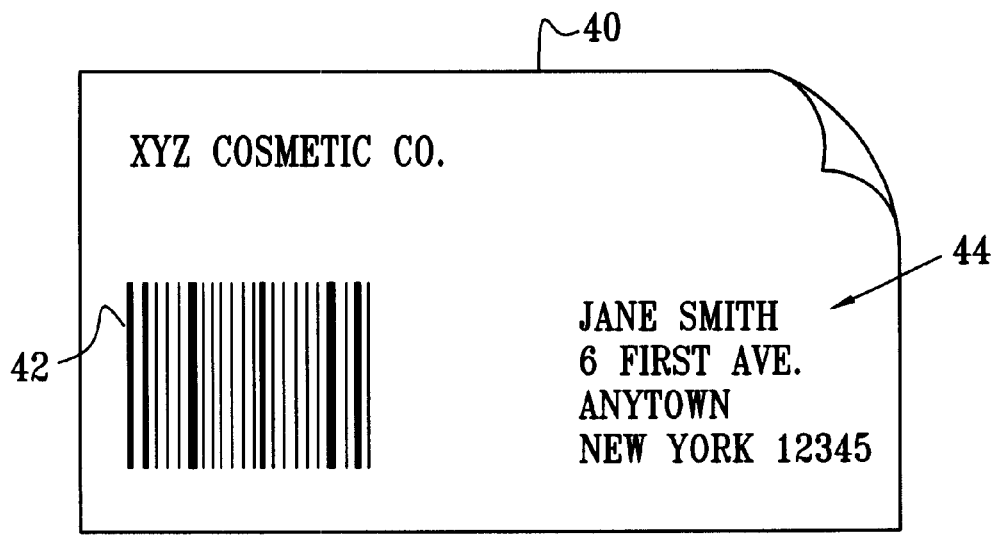
FIGS. 2A, 2B and 2C are schematic representations of parcel labels, useful in understanding the operation of the present invention.
Figure 2B:
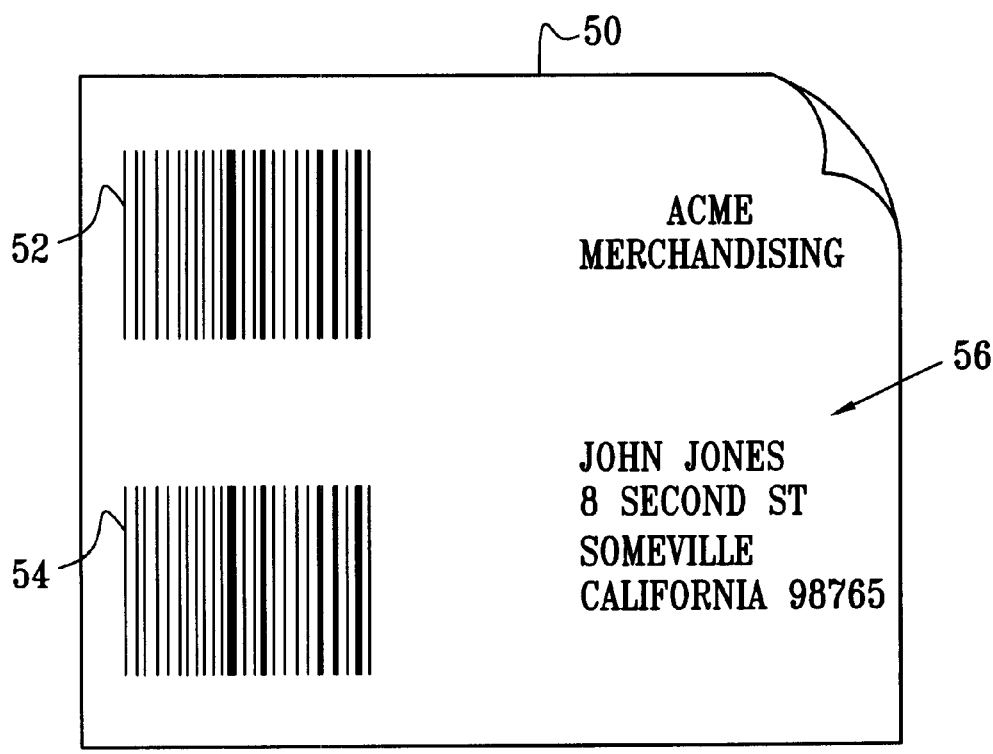
Figure 2C:
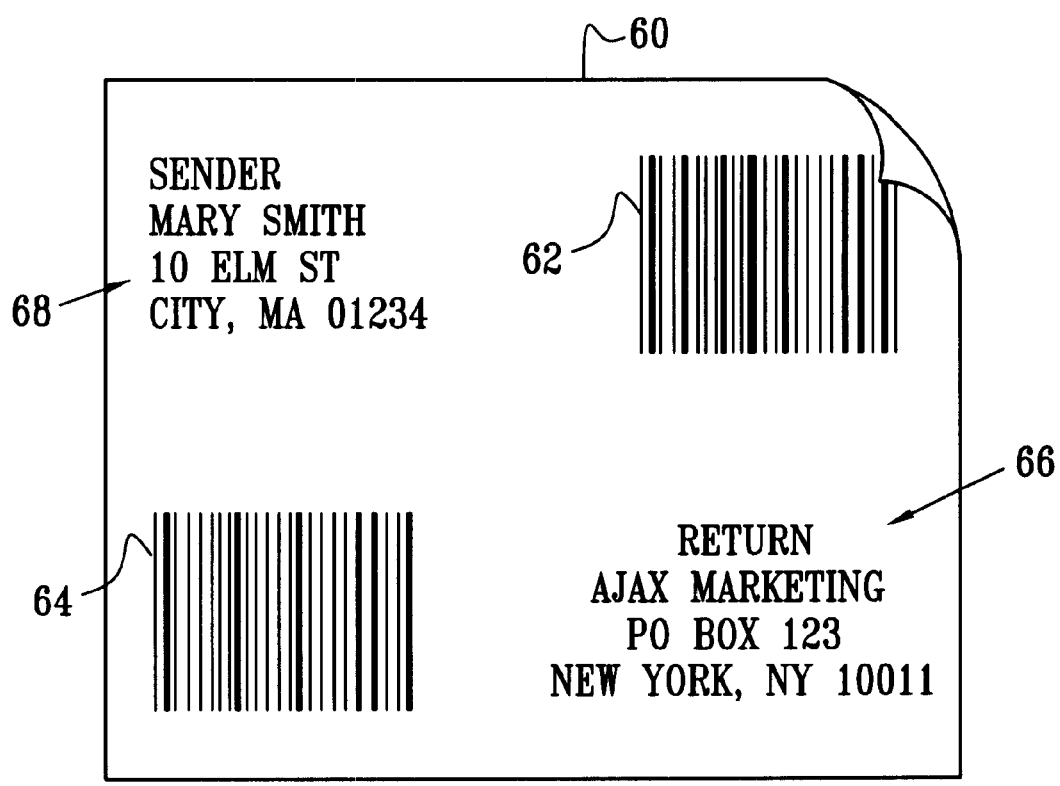

FIGS. 2A, 2B and 2C schematically illustrate labels 40, 50 and 60, exemplifying label types that are typically encountered in system 20. Label 40 has a destination address 44 alongside a barcode 42. As noted in the Background of the Invention, the barcode uniquely identifies the parcel to which the label is affixed, typically including an identification number of a mass mailer sending the parcel, in this case the "XYZ Cosmetic Co." Label 50 includes two barcodes 52 and 54, in addition to a destination address 56. Label 60 also has two barcodes 62 and 64, but in a different layout from label 50.

Label 60 includes both a destination address 66 and a return address 68. In this case, however, the destination address actually refers to the mass mailer, "Ajax Marketing," to whom the sender is returning the parcel to which the label has affixed. Typically, a return label such as label 60 is printed by the mass mailer and is included in a parcel of merchandise that is shipped to a customer. If the customer does not wish to keep the merchandise, she can simply affix the return label to the parcel and mail it back to the mass mailer. In automatic sorting of this parcel, it is crucial that system 20 distinguish destination address 66 correctly from return address 68 in order to avoid misrouting of the parcel. Such misrouting can also occur when the system mistakes the mass mailer's return address for that of the addressee, or mistakes some other writing on the parcel for the destination address. Errors in identification of the destination address on a parcel are referred to herein as "substitutions."

Figure 3:
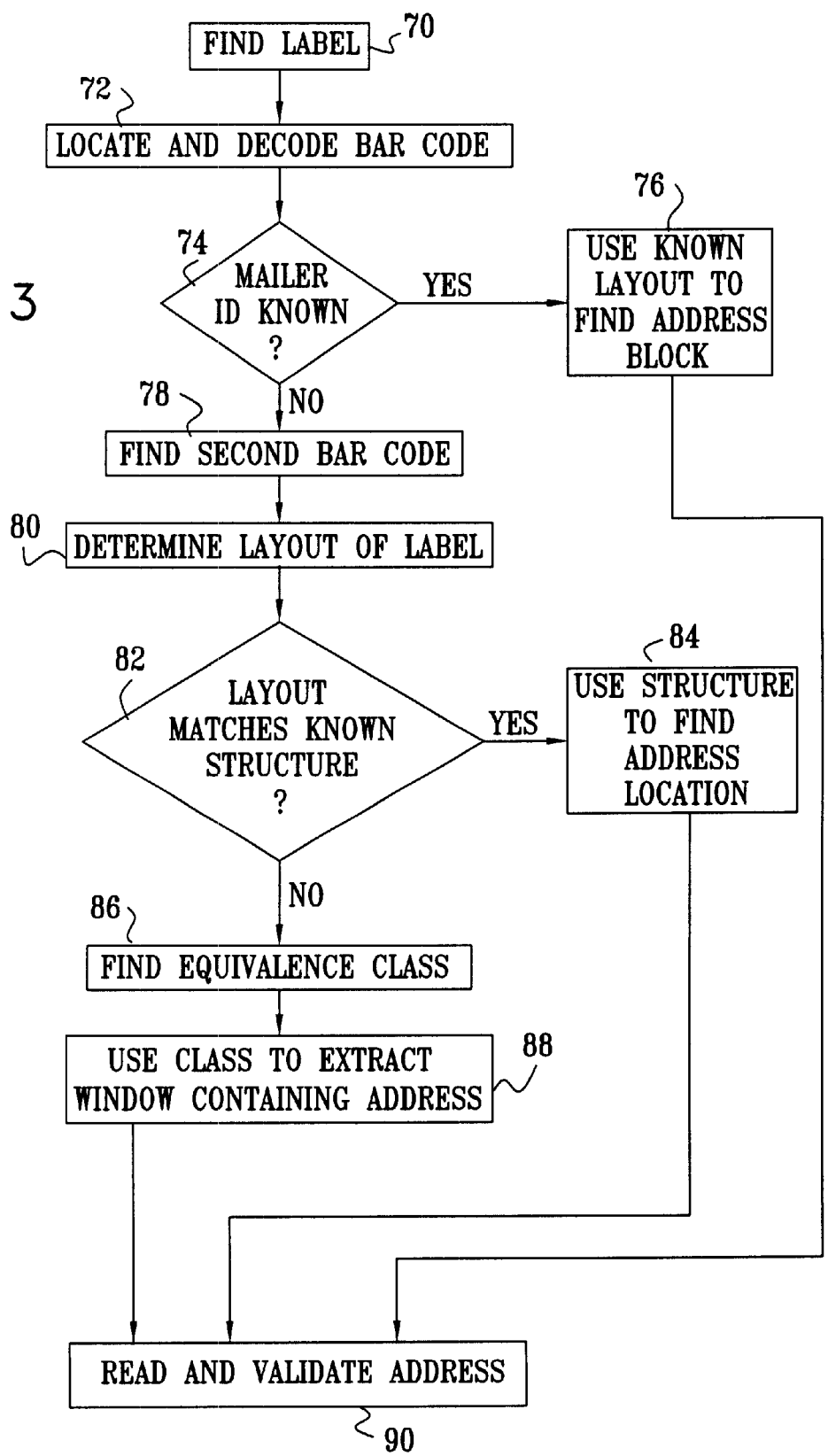
FIG. 3 is a flow chart that schematically illustrates a method for locating and reading a destination address on a parcel label, in accordance with a preferred embodiment of the present invention.

FIG. 3 is a flow chart that schematically illustrates a method for locating and reading the destination addresses on parcels processed by system 20, in accordance with a preferred embodiment of the present invention. Initially, after camera 28 captures an image of parcel 22, processor 30 analyzes the image to find label 24, at a label finding step 70. The label may be located using any suitable method of image analysis known in the art, based generally on finding an area of the image containing text and barcodes that meet appropriate criteria. The processor then attempts to find the edges or the label around the text and barcode area. An exemplary method for finding text areas in an image of a package is described in U.S. patent application Ser. No. 09/268,137, which is assigned to the assignee of the present patent application, and whose disclosure is incorporated herein by reference. At a barcode reading step 72, the processor finds the barcodes on the label and analyzes them to read out the numbers that they represent. Alternatively, the barcodes may be read by a suitable laser scanner, as is known in the art. Further alternatively, other machine-readable indicia, not necessarily barcodes, may also be used in the context of the present invention.

When parcel 22 has been sent by a mass mailer, one of the barcodes typically contains a number that identifies the mailer. This number is referred to herein as the mailer ID. At an ID check step 74, processor 30 compares the mailer ID given by the barcode to a database of known mailer IDs. The database also contains information on the respective labels that are habitually used by the mass mailers. Any given mass mailer will typically use labels of a certain consistent layout, in which the destination address is always in a fixed location relative to the barcode. Processor 30 preferably gathers and updates this information autonomously, as described in detail hereinbelow with reference to FIG. 5.

If the database includes a known label layout associated with the current mailer ID, processor 30 assumes that this is the layout of current label 24. On the basis of the known layout and the location of the barcode found on label 24, the processor computes the expected location of the destination address, at a known label identification step 76. It may occur that the database contains a number of different possible layouts for a particular mass mailer. In this case, processor 30 preferably checks some or all of these layouts to find the one that gives the best match to label 24. In any case, once the correct layout is found, the contents of the address are read, preferably using methods of optical character recognition (OCR), as are known in the art, at a label reading step 90. This step preferably also includes validation of the address data, as described further hereinbelow.

If there is not a suitable known layout for the current mailer ID, it may still be possible to identify the label as belonging to a standard type with a known geometrical layout. This layout may be dictated by the postal service or parcel company, for instance, or it may simply be a type that is generated by label printing software or printing equipment that is in common use. Many such labels contain two barcodes, as illustrated in FIGS. 2B and 2C, for example. Thus, at a second barcode finding step 78, processor 30 checks label 24 for the existence of a second barcode. If the second barcode is found, then the coordinates of the second barcode are determined relative to the first one, at a layout determination step 80. The coordinates are preferably determined by fixing an origin at a specified point on one of the barcodes and finding a distance and polar angle from the origin to a specified point on the other barcode. The distance is preferably normalized to the dimensions of the barcodes themselves, in order to compensate for scaling variations that may occur in capturing the image of the parcel.

At a layout matching step 82, the relative coordinates of the two barcodes are checked against a database of known, standard label structural types. Each type is characterized by the relative coordinates of the two barcodes that it contains, along with location coordinates of the destination address relative to the barcodes. If the coordinates of the barcodes on label 24 match one of the known types to within predetermined bounds, the label is then assumed to belong to this type. At an address location step 84, the known location coordinates of the destination address for this structural type are used to find the address on label 24, which is then read and validated at step 90.

It may also occur that label 24 contains only a single barcode, or that its two barcodes do not match any known structural type. In this case, processor 30 attempts to assign the label to one of a number of equivalence classes, at an equivalence finding step 86. Each class is preferably characterized by the location and direction of the barcode on the label that contains the mailer ID, as well as by the general shape of the label (rectangular or square). Alternatively or additionally, other characteristics may be used to define equivalence classes. The classes are defined so as to be invariant under scaling and rotation of the labels, including inversion (180° rotation). By locating the label outlines and the position and direction of the barcode on label 24, processor 30 assigns the label to the class to which it most closely belongs. A preferred set of equivalence classes is illustrated in FIG. 4 and described hereinbelow.

Once the equivalence class has been determined, processor 30 uses the characteristics of the class to identify the boundaries of a window expected to contain the destination address, at a window extraction step 88. The window in this case is defined based on the likely location of the address, given the known location of the barcode and the assigned equivalence class. This window must generally take in a substantially larger area than the well-defined address locations that are found at steps 76 and 84, when the label type or structure is known. At step 90, the processor searches this window to find and read the destination address. If the processor cannot successfully classify the label and find the destination address, the parcel is diverted for manual sorting.

Figure 4:
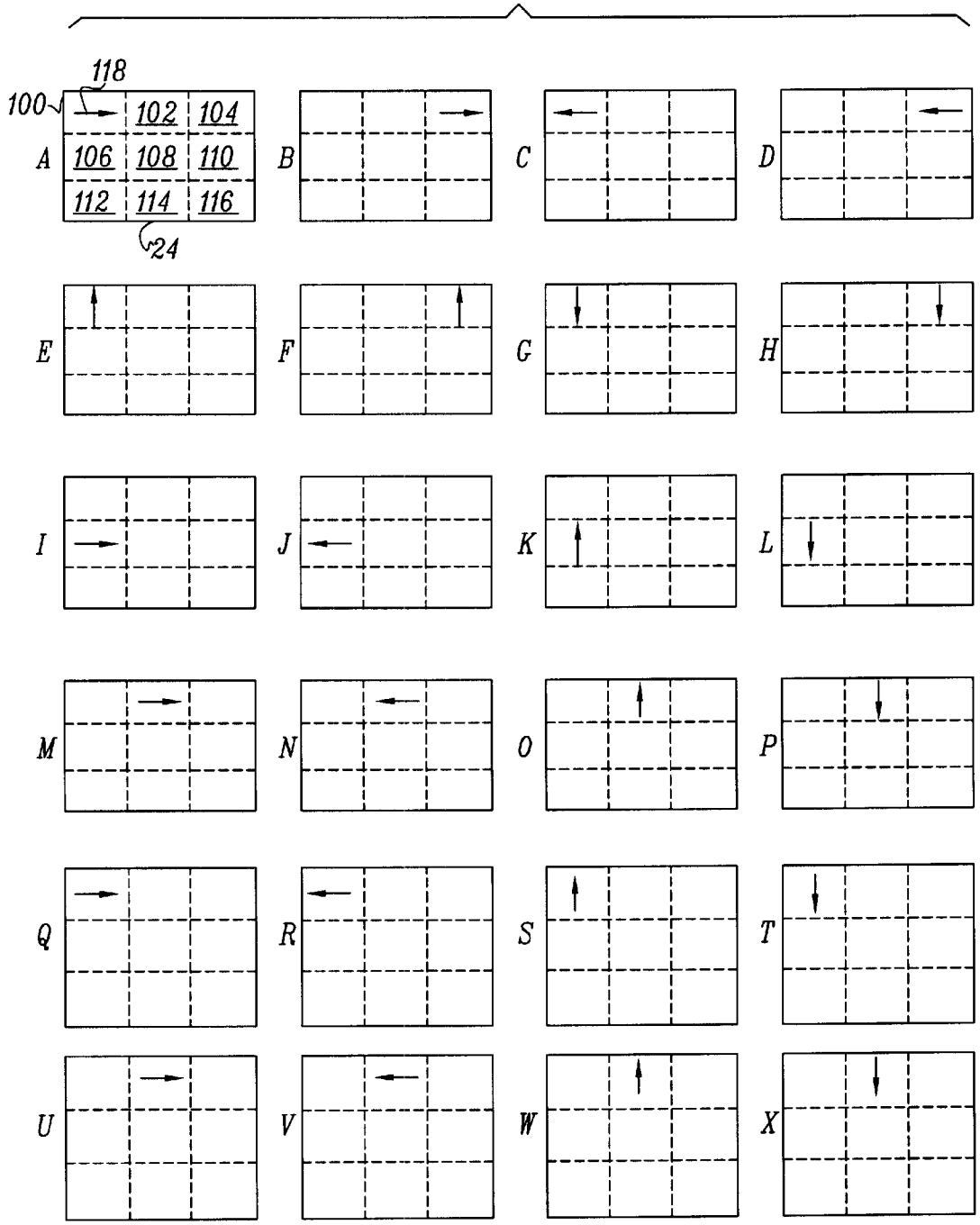
FIG. 4 is a diagram that schematically illustrates equivalence classes of address labels, in accordance with a preferred embodiment of the present invention.

FIG. 4 is a diagram that schematically illustrates twenty-four equivalence classes, labeled A through X, into which parcel labels are classified at step 86, in accordance with a preferred embodiment of the present invention. The classes are defined by dividing label 24 into nine sectors 100 through 116. Sixteen classes (A through P) relate to rectangular labels, while the remaining eight classes (Q through X) relate to labels that are exactly or approximately square. Each class is characterized by the sector in which the barcode that identifies the mailer appears and the direction of reading the barcode in the sector. As the barcode rarely appears in the center of the label, there are no classes defined with the barcode in sector 108.

The barcode and its direction are represented in class A, for example, by an arrow 118 in sector 100. This class is characterized as a rectangular label having a barcode in one of its corners that points along the long dimension of the label in a clockwise direction. Because the classes are invariant under rotation, a label observed to have a barcode in sector 116 reading from right to left would also belong to class A, for example. It is known that labels in equivalence class A generally have destination addresses in an area falling within sectors 108, 110, 114 and 116. Therefore, this is the area within which the window is identified at step 88, for extraction of the address therefrom. Similar rules are applied to each of the other classes.

Although it has been found that the twenty-four equivalence classes give good results in sorting parcels, it will be understood that these classes have been chosen for convenience and are described herein by way of example, and not limitation. Labels may be divided into greater or lesser numbers of sectors for the purpose of classification, and other geometrical and topological properties of the labels may also be used in defining the equivalence classes.

Returning now to FIG. 3, at label reading step 90, the destination address is validated to ensure that the correct address has been found, and in particular to prevent substitution of the sender's address or other data for the destination address. This added precaution is especially desirable with regard to parcel return labels, such as label 60 (FIG. 2C). The validation is preferably based on one or more of the following mechanisms:

Destination postal code filtering—If the postal code (such as the ZIP code) of the destination address that has been read by processor 30 is the same as, or very close to, that of the mass mailer identified by the barcode on the parcel, the destination address is rejected. Similarly, when the sender's postal code is printed above the barcode identifying the sender, as it often is, the destination address is rejected if the postal code in the destination address is the same as, or very close to, this printed postal code. An exception to these rules is made when one of the barcodes on the parcel indicates that this is a return parcel. In this case, the destination address is preferably required to contain a postal code that belongs to one of the mass mailer's return centers, as listed in a database maintained by system 20.

Keyword checking—If the destination address read by the processor contains keywords such as "telephone,"

"sender" or "from," the address is preferably rejected or, at least, is marked as doubtful. On the other hand, if the address contains certain other keywords, such as "Mr." or "Ms," it is considered more likely to be the correct destination address.

Layout checking—If the processor found and read the destination address from an area of the label that does not fit a known layout, the address is also preferably rejected or marked as doubtful. Furthermore, certain areas of the package surface, such as an area to the left of the barcode, are considered to be "forbidden" as locations for the destination address, even when the borders of the label cannot be clearly identified.

Double label identification—In some cases, when a customer returns a parcel to the mass mailer, the return label is meant to be pasted over the original shipping label. If the return label is not positioned precisely over the original label, however, system 20 may read two barcodes identifying the mass mailer. In such a case, the barcode indicating that this is a return parcel is considered to be the valid one.

If the destination address found by processor 30 on label 24 fails any of the applicable mechanisms, parcel 22 is preferably routed for manual sorting.

Figure 5:
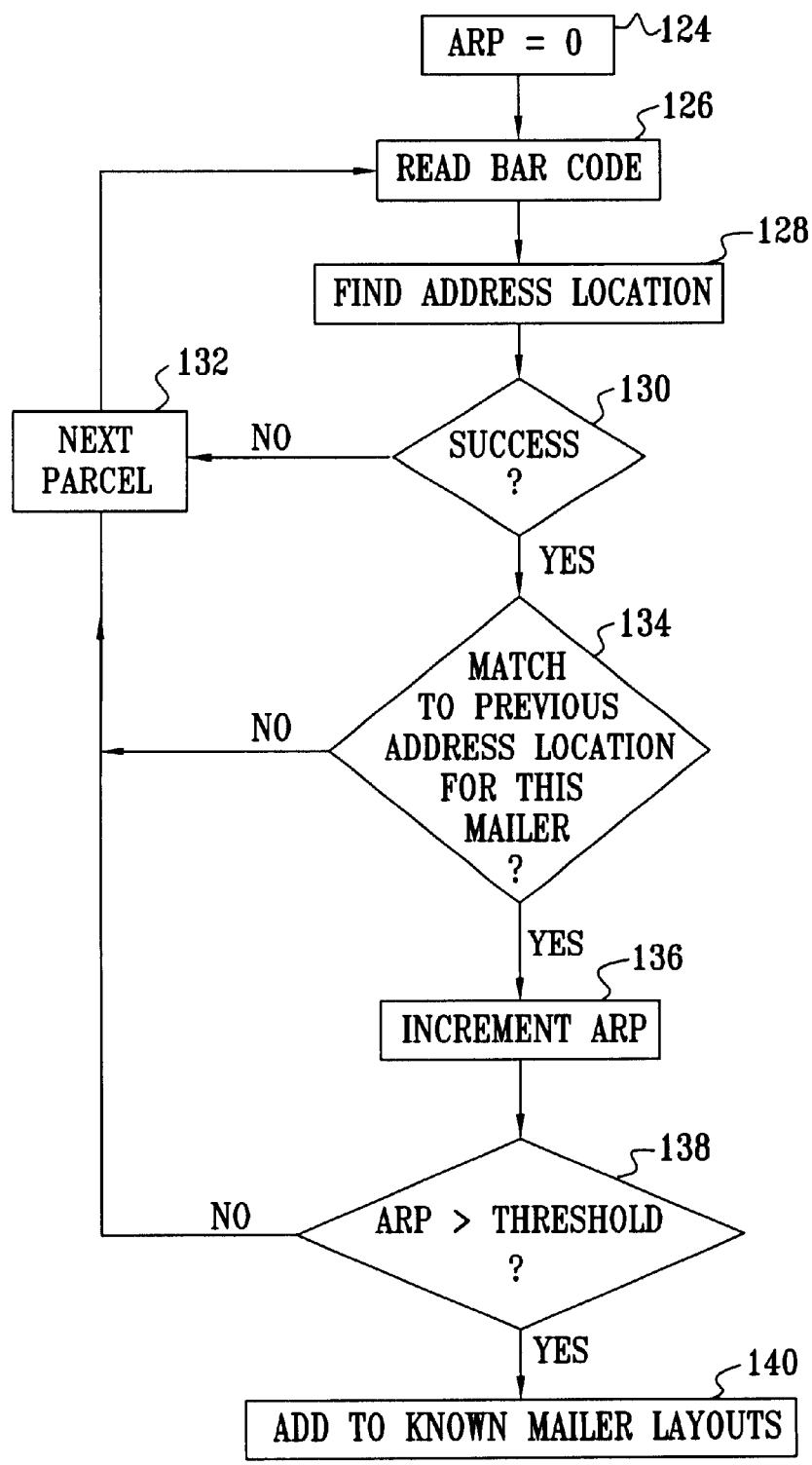
FIG. 5 is a flow chart that schematically illustrates a method for building a database of known label layouts, in accordance with a preferred embodiment of the present invention.

FIG. 5 is a flow chart that schematically illustrates a method for building the database of known label layouts for given mass mailers, used at step 76 in the method of FIG. 3, in accordance with a preferred embodiment of the present invention. The method of FIG. 5 can be implemented either on a collection of parcels belonging to a certain mass mailer or mailers, outside the course of normal operation of system 20, or alternatively, as a long-term adaptation method during operation of the system. It can also be used, mutatis mutandis, to build the database of generic label structures used at steps 82 and 84 in the method of FIG. 3.

The method of FIG. 5 is based on the computation of an address repetition probability (ARP) for each different layout that is encountered for an given mass mailer. For each possible layout, the ARP is initialized to zero, at an initialization step 124. For each trial parcel, the barcode identifying the sender of the parcel is found and read, at a barcode reading step 126. The barcode is analyzed to determine the identity of the mass mailer who sent the parcel. The location of the destination address on the parcel is determined, at an address location step 128. Steps 126 and 128 may take place in the context of the method of finding destination addresses shown in FIG. 3. If the system is unsuccessful in autonomously finding the correct destination address, at a success evaluation step 130, the parcel is sent for manual sorting. The next parcel is brought along for analysis, at a next parcel step 132.

Assuming that the correct destination address was found, the position of the address relative to the barcode on the current label is checked against layouts of labels found previously to belong to this mass mailer, at a matching step 134. If there is a match for such a layout, then the corresponding ARP is incremented, at an incrementation step 136. Each subsequent match increments the ARP further until, at a thresholding step 138, the ARP is found to have exceeded a predetermined threshold. When the ARP of a given layout for a particular mass mailer rises above this threshold, system 20 considers that this is a preferred label layout for this mass mailer. The layout is added to the database of mass mailer labels, at a layout addition step 138, for use subsequently at step 76 (FIG. 3).

While preferred embodiments are described hereinabove with reference to sorting of parcels, the principles of the present invention may similarly be applied to automatic identification and sorting of other items that are marked with both machine-readable indicia and alphanumeric characters or other symbols. For example, methods in accordance with the present invention may be used for sorting of flats (in addition to parcels), or for routing of luggage in an airport or goods in process in a factory. Other applications will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for automatic sorting, comprising:
   receiving an item in a sequence of items to be sorted, each such item marked with a respective machine-readable identifying code and with respective characters in a layout relative to the code that varies from one item to another in the sequence;
   determining a position of the code on the item;
   responsive to the position of the code, finding a location of the characters in the layout; and
   processing the characters to determine a destination of the item.

2. A method according to claim 1, wherein the items comprise parcels in shipment, and wherein the code and characters are printed on a label affixed to the item.

3. A method according to claim 2, wherein the code comprises a barcode.

4. A method according to claim 1, wherein determining the position of the code comprises determining positions of first and second machine-readable codes on the item, and wherein finding the location of the characters comprises locating the characters in a coordinate frame defined by the first and second codes.

5. A method according to claim 4, wherein locating the characters comprises finding a known layout of a marking pattern on some of the items in the sequence based on the positions of the first and second codes, and locating the characters in the known layout.

6. A method according to claim 5, wherein the marking pattern corresponds to a label affixed to the item, on which the codes and the characters are printed.

7. A method according to claim 1, wherein processing the characters comprises verifying that the characters represent a valid destination for the item.

8. A method according to claim 7, wherein the respective identifying code identifies a sender of the item, and wherein verifying that the characters represent a valid destination comprises verifying that the determined destination does not comprises an address of the sender.

9. A method for automatic sorting, comprising:
   receiving an item in a sequence of items to be sorted, each such item marked with a respective machine-readable identifying code and with respective characters in a location relative to the code that varies from one item to another in the sequence;
   determining a position of the code on the item;
   responsive to the position of the code, finding the a location of the characters on the item; and
   processing the characters to determine a destination of the item, wherein the respective identifying code identifies a sender of the item, and wherein finding the location of the characters comprises finding a location based on a known layout of the characters relative to the code, wherein the known layout is associated with the identified sender.

10. A method for automatic sorting, comprising:

receiving an item in a sequence of items to be sorted, each such item marked with a respective machine-readable identifying code and with respective characters in a location relative to the code that varies from one item to another in the sequence;

determining a position of the code on the item;

responsive to the position of the code, finding the a location of the characters on the item; and processing the characters to determine a destination of the item, wherein finding the location of the characters comprises:

defining a plurality of topological classes, each class characterized by a common position of the code in a marking pattern on the items in the class and an area, relative to the code, in which the characters are located;

assigning the item to one of the classes based on the position of the code thereon; and finding the characters in the area that characterizes the class to which the item is assigned.

11. A method according to claim 10, wherein defining the topological classes comprises defining classes that are invariant under rotation of the marking pattern.

12. A method according to claim 10, wherein the code comprises a barcode, and wherein each class is further characterized by a reading direction of the barcode relative to the marking pattern.

13. A method according to claim 10, wherein the marking pattern corresponds to a label affixed to the item, on which the codes and the characters are printed.

14. A method according to claim 13, wherein the classes are further characterized by a shape of the label, and wherein assigning the item to one of the classes comprises assigning the item responsive to the shape of the label affixed thereto.

15. A method for automatic sorting, comprising:

receiving an item in a sequence of items to be sorted, each such item marked with a respective machine-readable code identifying a sender of the item and with respective characters indicative of a destination of the item;

reading the code on the item; and processing the characters on the item, responsive to the code and to the sender identified thereby, to determine a destination of the item.

16. A method according to claim 15, wherein the items comprise parcels in shipment, and wherein the code and characters are printed on a label affixed to the item.

17. A method according to claim 16, wherein the code comprises a barcode.

18. A method according to claim 15, wherein reading the code comprises determining a position of the code on the item, and wherein processing the characters comprises finding a location of the characters responsive to the position of the code.

19. A method according to claim 18, wherein reading the code comprises identifying the sender responsive to the code, and wherein finding the location of the characters comprises associating a layout of the characters relative to the code with the identified sender, and determining the location based on the known layout.

20. A method according to claim 19, wherein associating the layout with the identified sender comprises maintaining, for each of a plurality of senders including the identified sender of the item, a respective record of one or more layouts used consistently by the sender to mark the code and characters on the items to be sorted, and selecting the known layout from the respective record.

21. A method according to claim 20, wherein maintaining the respective record comprises processing multiple items sent by the sender so as to find the one or more layouts used consistently by the sender.

22. A method according to claim 15, wherein reading the code comprises identifying the sender responsive to the code, and wherein processing the characters comprises verifying that the characters represent a valid destination for items sent by the identified sender.

23. A method according to claim 22, wherein verifying that the characters represent the valid destination comprises verifying that the determined destination does not comprises an address of the sender.

24. A method according to claim 23, wherein verifying that the determined destination does not comprise the address of the sender comprises comparing a postal code in the determined destination to a known postal code of the sender.

25. A method according to claim 22, wherein verifying that the characters represent the valid destination comprises comparing words spelled by the characters to a predetermined list of keywords.

26. A method according to claim 22, wherein verifying that the characters represent the valid destination comprises recognizing that the item has been returned from an original recipient of the item to the sender identified by the code, so that an address of the sender comprises the valid destination.

27. Apparatus for automatic sorting, which is configured to receive an item in a sequence of items to be sorted, each such item marked with a respective machine-readable identifying code and with respective characters in a layout relative to the code that varies from one item to another in the sequence, the apparatus comprising a processor, which is adapted to determine a position of the code on the item and, responsive to the position of the code, to find a location of the characters in the layout and to process the characters to determine a destination of the item.

28. Apparatus according to claim 27, wherein the items comprise parcels in shipment, and wherein the code and characters are printed on a label affixed to the item.

29. Apparatus according to claim 28, wherein the code comprises a barcode.

30. Apparatus according to claim 27, and comprising an imaging device, configured to capture an image of the item, wherein the processor is adapted to process the image in order to determine the destination of the item.

31. Apparatus according to claim 27, and comprising an automatic sorter, which is operative to route the item to the determined destination.

32. Apparatus according to claim 27, wherein the processor is operative to determine positions of first and second machine-readable codes on the item, and to find the location of the characters in a coordinate frame defined by the first and second codes.

33. Apparatus according to claim 27, wherein the processor is further operative to verify that the characters represent a valid destination for the item.

34. Apparatus for automatic sorting, which is configured to receive an item in a sequence of items to be sorted, each such item marked with a respective machine-readable identifying code and with respective characters in a location relative to the code that varies from one item to another in the sequence, the apparatus comprising a processor, which is adapted to determine a position of the code on the item and, responsive to the position of the code, to find a location of the characters on the item and to process the characters to determine a destination of the item, wherein the respective identifying code identifies a sender of the item, and wherein the processor is operative to find the location of the characters based on a known layout of the characters relative to the code, wherein the known layout is associated with the identified sender.

35. Apparatus for automatic sorting, which is configured to receive an item in a sequence of items to be sorted, each such item marked with a respective machine-readable identifying code and with respective characters in a location relative to the code that varies from one item to another in the sequence, the apparatus comprising a processor, which is adapted to determine a position of the code on the item and, responsive to the position of the code, to find a location of the characters on the item and to process the characters to determine a destination of the item, wherein the processor is operative to assign the item, based on the position of the code thereon, to one of a plurality of topological classes, each class characterized by a common position of the code in a marking pattern on the items in the class and by an area, relative to the code, in which the characters are located, and to find the characters in the area that characterizes the class to which the item is assigned.

36. Apparatus for automatic sorting, which is configured to receive an item in a sequence of items to be sorted, each such item marked with a respective machine-readable code identifying a sender of the item and with respective characters indicative of a destination of the item, and comprising a processor, which is operative to read the code on the item and to process the alphanumeric characters on the item, responsive to the code and to the sender identified thereby, to determine a destination of the item.

37. Apparatus according to claim 36, wherein the items comprise parcels in shipment, and wherein the code and characters are printed on a label affixed to the item.

38. Apparatus according to claim 37, wherein the code comprises a barcode.

39. Apparatus according to claim 36, and comprising an imaging device, configured to capture an image of the item, wherein the processor is adapted to process the image in order to determine the destination of the item.

40. Apparatus according to claim 36, and comprising an automatic sorter, which is operative to route the item to the determined destination.

41. Apparatus according to claim 36, wherein the processor is adapted to determine a position of the code on the item and to find a location of the characters responsive to the position of the code.

42. Apparatus according to claim 41, wherein the processor is operative to identify the sender responsive to the code and to associate a layout of the characters relative to the code with the identified sender, so as to determine the location based on the known layout.

43. Apparatus according to claim 42, wherein the processor is coupled to access, for each of a plurality of senders including the sender of the item, a respective record of one or more layouts used consistently by the sender to mark the code and characters on the items to be sorted, and to select the known layout from the respective record.

44. Apparatus according to claim 43, wherein the processor is operative to create the respective record by processing multiple items sent by the sender so as to find the one or more layouts used consistently by the sender.

45. Apparatus according to claim 36, wherein the processor is further adapted to verify that the characters represent a valid destination for items sent by the identified sender.

46. A computer program product, comprising a computer-readable medium in which program instructions are stored, which instructions, when read by a computer receiving an image of an item in a sequence of items to be sorted, each such item marked with a respective machine-readable identifying code and with respective characters in a layout relative to the code that varies from one item to another in the sequence, cause the computer to determine a position of the code on the item and, responsive to the position of the code, to find a location of the characters in the layout and to process the characters to determine a destination of the item.

47. A computer program product for automatic sorting, comprising a computer-readable medium in which program instructions are stored, which instructions, when read by a computer receiving an image of an item in a sequence of items to be sorted, each such item marked with a respective machine-readable code identifying a sender of the item and with respective characters indicative of a destination of the item, cause the computer to read the code on the item, and to process the characters on the item, responsive to the code and to the sender identified thereby, to determine a destination of the item.

48. A computer program product, comprising a computer-readable medium in which program instructions are stored, which instructions, when read by a computer receiving an image of an item in a sequence of items to be sorted, each such item marked with a respective machine-readable identifying code and with respective characters in a location relative to the code that varies from one item to another in the sequence, cause the computer to determine a position of the code on the item and, responsive to the position of the code, to find the location of the characters on the item and to process the characters to determine a destination of the item, wherein the respective identifying code identifies a sender of the item, and wherein the instructions cause the computer to find the location of the characters based on a known layout of the characters relative to the code, wherein the known layout is associated with the identified sender.

49. A computer program product, comprising a computer-readable medium in which program instructions are stored, which instructions, when read by a computer receiving an image of an item in a sequence of items to be sorted, each such item marked with a respective machine-readable identifying code and with respective characters in a location relative to the code that varies from one item to another in the sequence, cause the computer to determine a position of the code on the item and, responsive to the position of the code, to find the location of the characters on the item and to process the characters to determine a destination of the item, wherein the instructions cause the computer to assign the item, based on the position of the code thereon, to one of a plurality of topological classes, each class characterized by a common position of the code in a marking pattern on the items in the class and by an area, relative to the code, in which the characters are located, and to find the characters in the area that characterizes the class to which the item is assigned.

\* \* \* \* \*